(12) United States Patent
Wohltmann et al.

(10) Patent No.: US 8,366,209 B2
(45) Date of Patent: Feb. 5, 2013

(54) VEHICLE BRAKING SYSTEM

(75) Inventors: Dirk Wohltmann, Birmingham, MI (US); Thomas Wolf, Barsinghausen (DE); Thomas Lenz, Lehrte (DE)

(73) Assignee: WABCO GmbH, Hannover (DE)

( * ) Notice: Subject to any disclaimer, the term of this patent is extended or adjusted under 35 U.S.C. 154(b) by 530 days.

(21) Appl. No.: 12/658,410

(22) Filed: Feb. 8, 2010

(65) Prior Publication Data

US 2011/0193407 A1    Aug. 11, 2011

(51) Int. Cl.
*B60T 13/68* (2006.01)

(52) U.S. Cl. ....................................................... 303/124

(58) Field of Classification Search ................ 303/3, 17, 303/124, 122.15, 127, 191; 701/70–72
See application file for complete search history.

(56) References Cited

U.S. PATENT DOCUMENTS

| | | | | |
|---|---|---|---|---|
| 5,427,440 A * | 6/1995 | Ward et al. | .................... | 303/3 |
| 6,033,037 A * | 3/2000 | Eckert | .................... | 303/114.3 |
| 6,125,318 A * | 9/2000 | Zierolf | .................... | 701/71 |
| 2005/0029859 A1 * | 2/2005 | Bensch et al. | .................... | 303/89 |
| 2005/0134110 A1 * | 6/2005 | Reuter et al. | .................... | 303/114.1 |
| 2007/0138864 A1 * | 6/2007 | Fitton et al. | .................... | 303/144 |
| 2007/0138865 A1 * | 6/2007 | Amato | .................... | 303/191 |
| 2008/0030068 A1 * | 2/2008 | Bensch et al. | .................... | 303/17 |
| 2010/0237690 A1 * | 9/2010 | Forster et al. | .................... | 303/13 |

* cited by examiner

*Primary Examiner* — Christopher Schwartz
(74) *Attorney, Agent, or Firm* — Kramer Levin Naftalis & Frankel LLP

(57) ABSTRACT

An improved braking system and brake control method for a vehicle, in particular a truck, utilizes at least one pressure line for carrying a medium from at least one pressurized medium source to a brake device, and a brake pedal for receiving brake commands from a vehicle driver and for operating a brake line, which can be connected to the brake device. A pilot control valve with accompanying measuring capability quantitatively determines the brake pressure demanded by the vehicle driver.

20 Claims, 5 Drawing Sheets

VEHICLE BRAKING SYSTEM

FIELD OF THE INVENTION

The present invention generally relates to an improved braking system and method for a vehicle, in particular a truck, that quantitatively determine the brake pressure demanded by the vehicle driver.

BACKGROUND OF THE INVENTION

Known braking systems of the general type under consideration include at least one pressure line for carrying compressed air from at least one pressurized compressed air source to a brake device, and a brake pedal for receiving brake commands from a vehicle driver and for operating a brake line, which can be connected to the brake device. Such systems are used in trucks as well as in other vehicle types.

Trucks are often equipped with driving assistance systems that also include systems that actively control braking performance. With the aid of various sensors, such brake assist systems register the driving situation at any given time and, in specific situations, undertake braking operations according to the evaluation of these data. In each case, this is effected without active intervention on the part of the vehicle driver. In order to preclude negative influences on vehicle handling, control of the braking performance by the brake assist systems is discontinued as soon as the driver issues a brake command via the brake pedal. In known systems, the existence of a brake command on the part of the driver is registered by a pressure sensor, for example, that monitors the line pressure on the rear axle circuit or the front axle circuit of the vehicle. If this sensor registers the presence of a brake pressure, the control is discontinued and the full pressure controlled by the driver is transmitted to the vehicle trailer.

A disadvantage of such known braking systems is that simultaneous feedback control by the brake assist system and active braking ordered by the driver is not possible. Likewise, a quantitative determination of the brake pressure to be transmitted to the trailer is not possible in such known braking systems.

SUMMARY OF THE INVENTION

The present invention overcomes disadvantages associated with conventional braking systems and provides improved functionality and control response. Generally speaking, as described in greater detail hereinafter, the braking system according to embodiments of the present invention includes a pilot control valve with integral measuring capabilities (e.g., one or more pressure sensors) that quantitatively determines the brake pressure demanded by the vehicle driver. With the actual prevailing brake pressure being known, it can be controlled without, at the same time, having to discontinue the automatic braking function of the brake assist system. This results in improved control. Moreover, since the known brake pressure makes it possible to transmit an adequate brake pressure to the vehicle trailer system, the control accuracy of the trailer brake pressure is also enhanced. Additionally, a cost savings can be realized since air consumption can be reduced.

According to an alternative embodiment of the present invention, the quantitative determination of the brake pressure demanded by the vehicle driver is effected using a pilot control valve and slip and/or deceleration controllers assigned thereto.

A vehicle brake control method in accordance with an exemplary embodiment of the present invention includes the steps of: (i) transmitting a pressurized medium from at least one medium source through at least one pressure line to a brake device; (ii) pressurizing a brake line by the operation of a brake pedal by the vehicle driver; (iii) actuating the brake device by means of the pressure; and (iv) quantitatively determining the brake pressure demanded by the driver.

Still other objects and advantages of the present invention will in part be obvious and will in part be apparent from the specification.

The present invention accordingly comprises the features of construction, combination of elements, and arrangement of parts that will be exemplified in the constructions hereinafter set forth, as well as the various steps and the relation of one or more of such steps with respect to each of the others, and the scope of the invention will be indicated in the claims.

BRIEF DESCRIPTION OF THE DRAWINGS

For a fuller understanding of the present invention, reference is had to the following description taken in connection with the accompanying drawings in which.

DETAILED DESCRIPTION OF THE PREFERRED EMBODIMENTS

Figure 1:
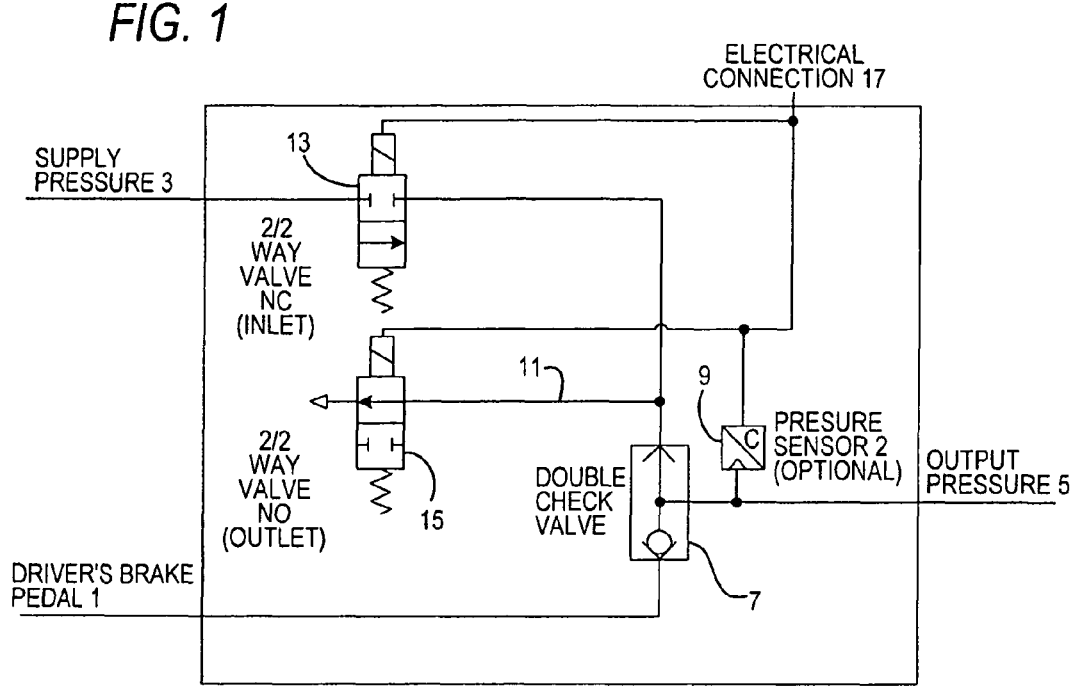
FIG. 1 is a schematic representation of a pilot control valve with integral pressure sensor in accordance with an embodiment of the present invention.

As stated above, the present invention provides an improved braking system including a pilot control valve with integral measuring capabilities that quantitatively determines the brake pressure demanded by the vehicle driver. The pilot control valve can be provided on a front axle brake circuit and/or a rear axle brake circuit of the vehicle tractor and on the brake circuit for a trailer. Integrating the measuring function into the pilot control valve makes the vehicle application easier and facilitates installation and servicing of the system.

Preferably, the measuring function outputs the brake pressure in the form of electrical signals. A plurality of known pressure sensors are suitably designed to measure a pressure and to convert this into a current or voltage signal. This signal can be polled by means of electrical lines from the sensors.

According to an embodiment of the present invention, a control unit receives and processes the signals corresponding to the measured brake pressure. Furthermore, the control unit can process and, where necessary, co-ordinate further signals from other sensors and areas of the vehicle electronics. These signals also include signals relayed from the driving safety and brake assist systems."

Preferably, the control unit can incorporate the signals received into a feedback control of the operation of the brake device. This highlights the advantage of a common control unit. The information from the brake assist system and further driving assistance systems are, in this case, combined in the control unit, where the output brake pressure is likewise received and processed. It is therefore possible, by means of the brake pressure measured in the pilot control valve, to form a closed-loop control circuit, which allows the automatic braking function of the brake assist system to be maintained, whilst the driver executes a brake command via the brake pedal.

Desirably, the control unit also can simultaneously process brake pressure signals representative of the brake pressures for stability control of the vehicle (e.g., from the autonomous brake assist system), and the measured brake pressure signals, which are representative of the brake pressure demanded by the driver of the vehicle. This can include a comparison of these signals.

According to an embodiment of the present invention, the pilot control valve includes a double check valve and a pressure sensor, the double check valve being constructed and arranged to conduct pressurized medium either from the brake line or from a branch line to an outlet line, and the pressure sensor being constructed and arranged to determine the pressure in the outlet line. Since the pressure sensor is assigned to the outlet line, it is possible to quantitatively determine both the controlled brake pressure supplied to the braking system from its pressure sources and the pressure generated by the driver via the brake pedal. These two pressures each prevail on an inlet of the double check valve. The double check valve conducts the higher of these two pressures at any given time to the outlet, where the pressure sensor is located.

According to a further embodiment of the present invention, the pilot control valve includes a double check valve and first and second pressure sensors. The double check valve is constructed and arranged to conduct the pressurized medium either from the brake line or from a branch line to an outlet line, or from the outlet line to an outlet, which is assigned to a branch of the branch line. The first pressure sensor is constructed and arranged to determine the pressure in the brake line and the second pressure sensor is constructed and arranged to determine the pressure in the branch line. The use of two pressure sensors in the respective inlet lines instead of a single pressure sensor in the outlet line affords the advantage that, irrespective of which of the two pressures entering the pilot control valve is greater, it is possible to determine both the pressure of the supply line and the pressure of the brake line coming from the driver's brake pedal.

According to another embodiment of the present invention, the pilot control valve includes two double check valves and three pressure sensors. The first double check valve is constructed and arranged to conduct pressurized medium either from the second double check valve or from the branch line to an outlet line. The second double check valve is constructed and arranged to conduct pressurized medium either from the brake line or from a second brake line to the connection of the first double check valve. The first pressure sensor is constructed and arranged to determine the pressure in the first or second brake line, and the second pressure sensor is constructed and arranged to determine the pressure in the branch line. The use of up to three pressure sensors means that the pressures in the two inlet lines and in the outlet line of the pilot control valve can be determined simultaneously. A balancing of this pressure information can be used, for example, to monitor the functioning of the sensors and/or the valve. The provision of a second double check valve, which conducts the pressure of either a first or a second brake line to the first double check valve, makes it alternatively possible, in addition to the brake line, which is also described in the other exemplary embodiments, to conduct the pressure from the second brake line, which is likewise connected to the driver's brake pedal. The provision of two such brake lines is advantageous particularly if one of the brake lines fails (possibly prescribed as safety-relevant).

At least one multi-way valve constructed and arranged to open or close at least one part of the branch line can be provided, the multi-way valve and/or at least one of the pressure sensors being electrically operated. Preferably, the multi-way valve is a 2/2-way valve. Other types of multi-way valves can be used, however, depending on the particular application. Like the pressure sensor(s), the multi-way valves are electrically connected to the control unit.

The multi-way valves are operated on the basis of electrical signals, which are transmitted, in particular, from the control unit to the multi-way valves. For determining the signals to be transmitted, the control unit here relies on, among other things, the electrical signals relayed to the control unit from the pressure sensors.

According to a further embodiment of the present invention, the pilot control valve is assigned to a valve arrangement for transmitting pressurized medium to a front axle brake device. This allows the braking performance of the front axle brakes to be controlled in a manner according to the invention.

In another embodiment of the inventive braking system, the pilot control valve is assigned to a valve arrangement for transmitting pressurized medium to a rear axle brake device. This allows the rear axle brakes to be controlled in a manner according to the invention.

In yet another embodiment, the pilot control valve is assigned to a tractor safety valve for transmitting pressurized medium to a vehicle trailer. This allows the brake pressure of a trailer braking system to be controlled in a manner according to the invention.

Integrating a pilot control valve into valve arrangements such as front axle, rear axle and tractor safety valve arrangements affords the advantage of being able to prefabricate the respective valve arrangements, including the pilot control valve, ready for assembly, which enables them to be fit to the vehicle in a compact and time-saving manner. This obviates the need for extensive installation and wiring works during final assembly to the extent that was necessary with conventional systems.

According to an embodiment of the present invention, the pilot control valve includes a service relay valve, which can be actuated by means of the pressure transmitted from the outlet line, in order to selectively conduct pressurized medium from a supply line to a trailer service coupling or to discharge it from there. The service relay valve allows the trailer service coupling to be subjected to the pressure of the supply line or to be switched to zero pressure.

According to another embodiment of the present invention, the quantitative determination of the brake pressure demanded by the vehicle driver is effected using a pilot control valve and slip and/or deceleration controllers assigned thereto. According to this embodiment, the pilot control valve does not include any integral pressure sensors. The closing of the closed-loop control circuit necessary for uninterrupted working of the automatic braking function is nevertheless advantageously achieved in that the signals from slip and/or deceleration controllers assigned to the pilot control valve are evaluated by means of the control unit. The elimination of the pressure sensors can lead to salutary cost savings.

Referring now to the drawing figures, FIG. 1 depicts a pilot control valve for regulating pressure with an integral pressure sensor. The pilot control valve includes two inlets and an outlet. A brake line 1 and a supply pressure line 3 are connected to the valve inlets. Brake line 1 carrying medium is connected to a brake pedal (not shown) such that a pressure is built up in the brake line in response to the operation of the brake pedal. An outlet line 5 is connected to the valve outlet. A pressure sensor 9, which is designed to determine the pressure in outlet line 5, or other suitable measuring device(s) for quantitatively determining the brake pressure is assigned to the outlet line.

The pilot control valve represented in the inventive embodiment depicted in FIG. 1 further includes a double check valve 7. Double check valve 7 has two inlets and one outlet, the inlets being connected on the one hand to brake line 1 and on the other to supply pressure line 3. A branch line 11 branches off from supply pressure line 3. The pilot control valve further comprises two 2/2-way valves 13, 15, one of which is assigned to supply pressure line 3 and the other to branch line 11. 2/2-way valve 13 assigned to supply pressure line 3 has an 'NC' configuration, which means that the valve is normally closed. 2/2-way valve 15 assigned to branch line 11 has a 'NO' configuration, which means that this valve is normally open. Sensor 9 and 2/2-way valves 13, 15 are electrically connected via lines 17 to a control unit (not shown). Double check valve 7 is constructed and arranged so that the higher of the pressures prevailing on the inlets of the double check valve is conducted to outlet line 5. Sensor 9 therefore registers either the pressure of supply pressure line 3 or the driver's brake pressure of brake line 1, depending on the switching state of double check valve 7.

Figure 2:
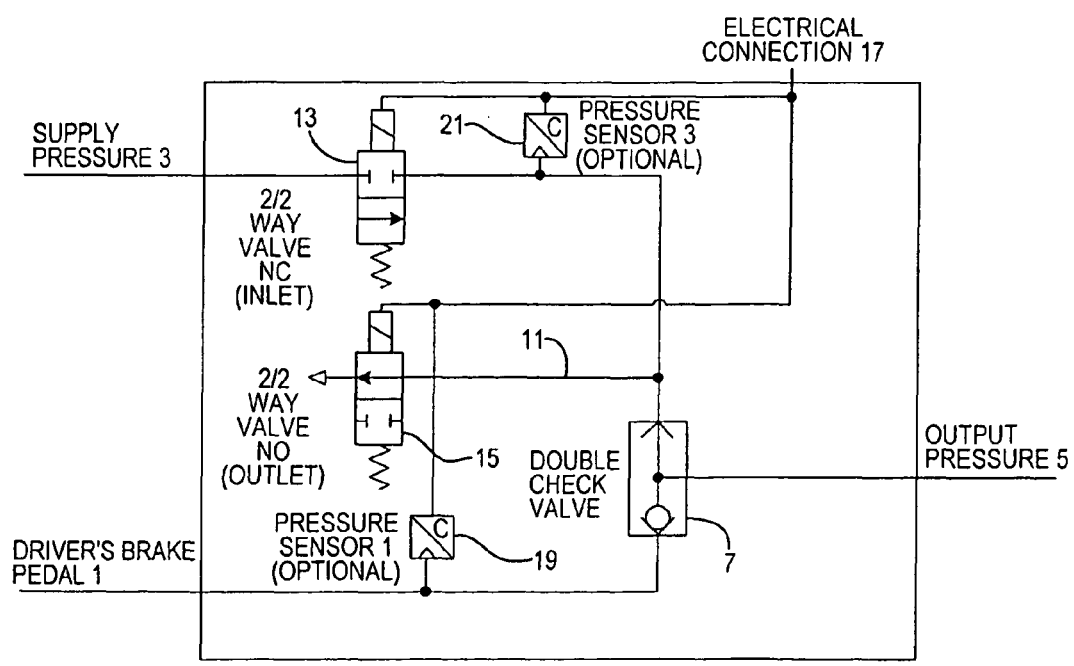
FIG. 2 depicts a further embodiment of a pilot control valve for regulating pressure in accordance with the present invention.

FIG. 2 depicts a further embodiment of a pilot control valve according to the present invention. Compared to the pilot control valve embodiment depicted in FIG. 1, the pilot control valve in FIG. 2 utilizes two pressure sensors 19, 21 to quantitatively determine the pressure in the pilot control valve, rather than single sensor 9, which is used to quantitatively determine the pressure in outlet line 5. Sensor 19 is assigned to brake line 1 connected to the driver brake signal; sensor 21 is assigned to supply pressure line 3. Both sensors 19, 21, like two 2/2-way valves 13, 15, are connected by electrical lines 17 to the control unit and are designed to transmit electrical signals. The pressure sensors are, here, capable of simultaneously determining the pressure in brake line 1 and in supply pressure line 3.

Figure 3:
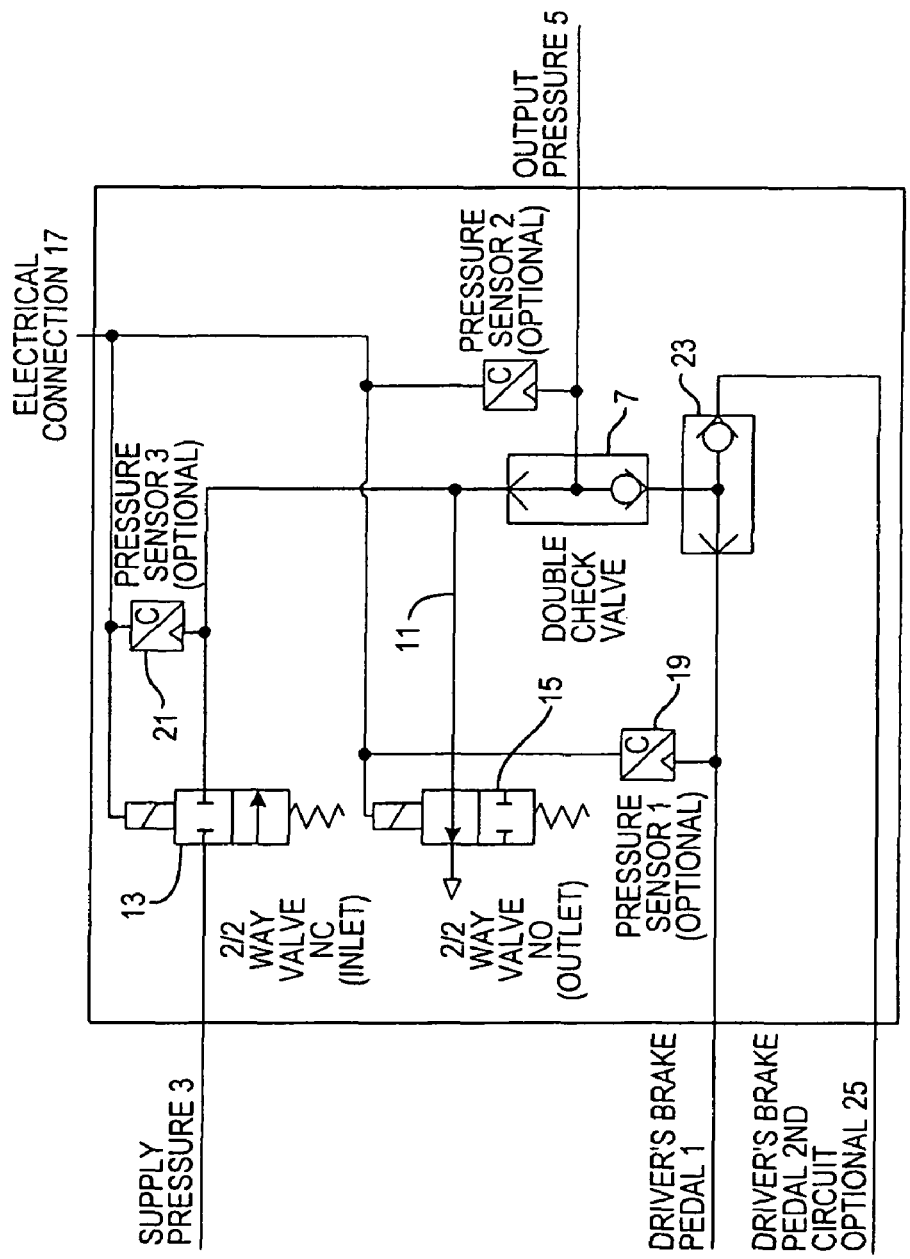
FIG. 3 is a schematic representation of another embodiment of a pilot control valve for regulating pressure in accordance with the present invention.

FIG. 3 depicts another embodiment of a pilot control valve according to the present invention. In the pilot control valve embodiment shown in FIG. 3, outlet line 5, brake line 1 and supply pressure line 3 each have sensors 9, 19, 21, respectively, assigned to them and are constructed and arranged to quantitatively determine the pressure in known manner. The pilot control valve depicted in FIG. 3 is supplemented by a further line inlet—in addition to the first brake line 1, a second brake line 25 is connected to the pilot control valve. Second brake line 25 is likewise connected to the brake pedal (not shown), but is supplied with pressurized medium from another medium circuit. This will be described in greater detail below with reference to FIG. 5. The pilot control valve according to FIG. 3 also includes a second double check valve 23, which has two inlets and one outlet. Brake lines 1, 25 are each connected to an inlet of double check valve 23, and the outlet of double check valve 23 is connected to an inlet of double check valve 7.

In operation, the pilot control valve embodiment depicted in FIG. 3 will always conduct that pressure which is higher from double check valve 23 to double check valve 7. This has the particular advantage that should either brake line fail the other brake line will ensure a smooth operation and maintain the facility for braking by the driver. Since the pressures are quantitatively determined both in brake line 1, in supply pressure line 3 and in outlet line 5, it is possible to monitor the correct function of the pilot control valve and/or the braking system.

Figure 4:
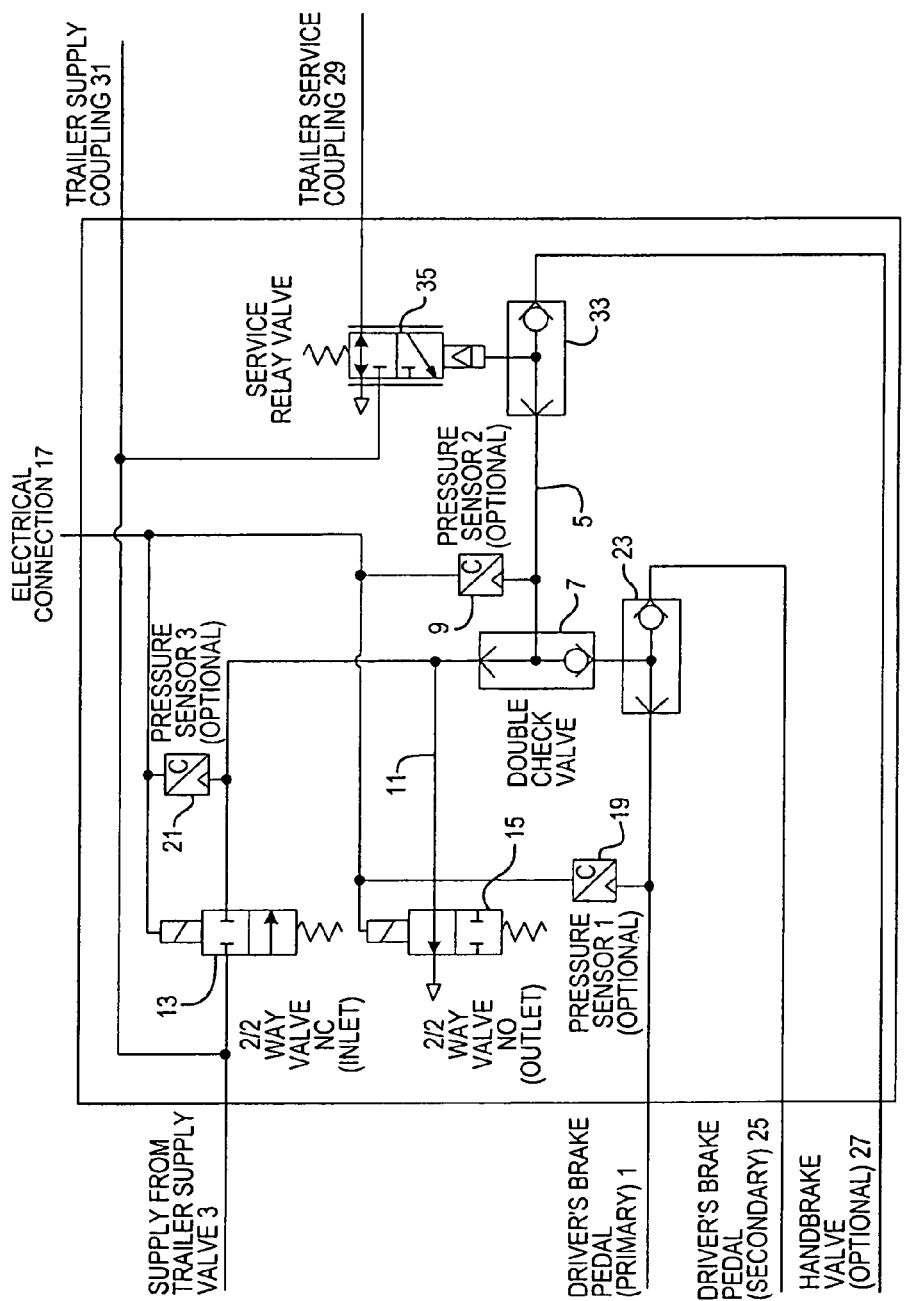
FIG. 4 is a schematic representation of a tractor safety valve with integral pilot control valve in accordance with an embodiment of the present invention.

FIG. 4 is a diagram of a tractor safety valve with integral pilot control valve. It can be seen that the pilot control valve, which is here an integral part, corresponds to the pilot control valve embodiment depicted in FIG. 3. It should be appreciated, however, that other pilot control valve embodiments can be utilized.

In addition to the pilot control valve, the tractor safety valve includes a third double check valve 33, which, in turn, includes two inlets, one of which is connected to outlet line 5 and the other to a pressure line 27, which is assigned to a handbrake valve. On the outlet side, the double check valve is assigned to a service relay valve 35. Third double check valve 33 is constructed and arranged to conduct either the output pressure of the pilot control valve or the pressure relayed by handbrake line 27 and to actuate service relay valve 35 accordingly. Service relay valve 35 is constructed and arranged to selectively conduct pressurized medium from supply pressure line 3 to a trailer brake line 29, or to discharge pressurized medium from trailer brake line 29. Trailer brake line 29 carrying medium is connected to a trailer brake coupling (not shown). In this exemplary embodiment, supply pressure line 3 has multiple branches and supplies the pilot control valve, service relay valve 35 and a trailer supply line 31 with pressurized medium.

Figure 5:
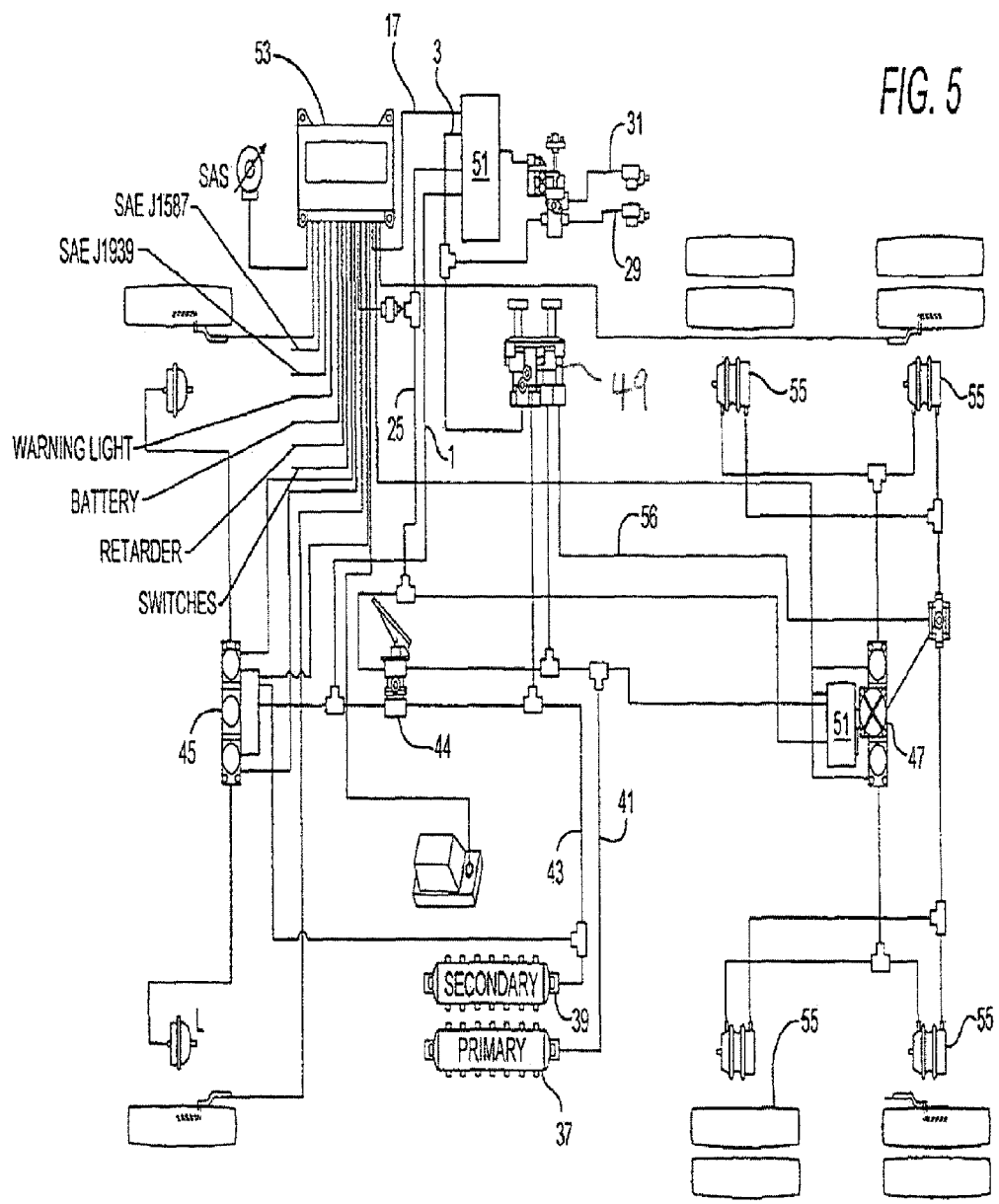
FIG. 5 is a schematic representation of a braking system according to embodiments of the present invention, showing two possible placements for the tractor safety valve.

FIG. 5 is a diagram of a braking system according to embodiments of the present invention. Pressurized medium is supplied to the system from a primary supply storage reservoir 37 and a secondary storage reservoir 39. The pressurized medium from primary storage reservoir 37 is fed to the system via a primary line 41, whilst the pressurized medium from secondary storage reservoir 39 is fed to the system via a secondary line 43. Pressurized medium is fed via lines 41, 43 to a brake pedal 44, a front axle valve arrangement 45, a rear axle valve arrangement 47 and a distributor valve arrangement 49.

The braking system shown in FIG. 5 includes a tractor safety valve 51 with integral pilot control valve. Pressurized medium is fed to the tractor safety valve through first brake line 1, second brake line 25 and supply pressure line 3. Supply pressure line 3 is connected on the one hand to tractor safety valve 51 and on the other to distributor valve arrangement 49, which is constructed and arranged to distribute pressurized medium provided from the primary or secondary storage reservoir 37, 39, to a front axle, rear axle and/or trailer medium circuit. A further pressure line 56 is likewise connected to distributor valve arrangement 49, in order to conduct pressurized medium to at least one rear axle brake device 55. Tractor safety valve 51 is connected by electrical lines 17 to a control unit 53, which is constructed and arranged to receive electrical signals from the tractor safety valve and to interpret and process them as measuring signals. On the outlet side, two further pressure lines are connected to tractor safety valve 51. These are trailer supply line 31 and trailer brake line 29.

In accordance with an alternative configuration of the braking system, tractor safety valve 51 can be located proximate rear axle valve arrangement 47. This alternative placement is also illustrated in FIG. 5 together with the placement described in the preceding paragraph.

Figure 6:
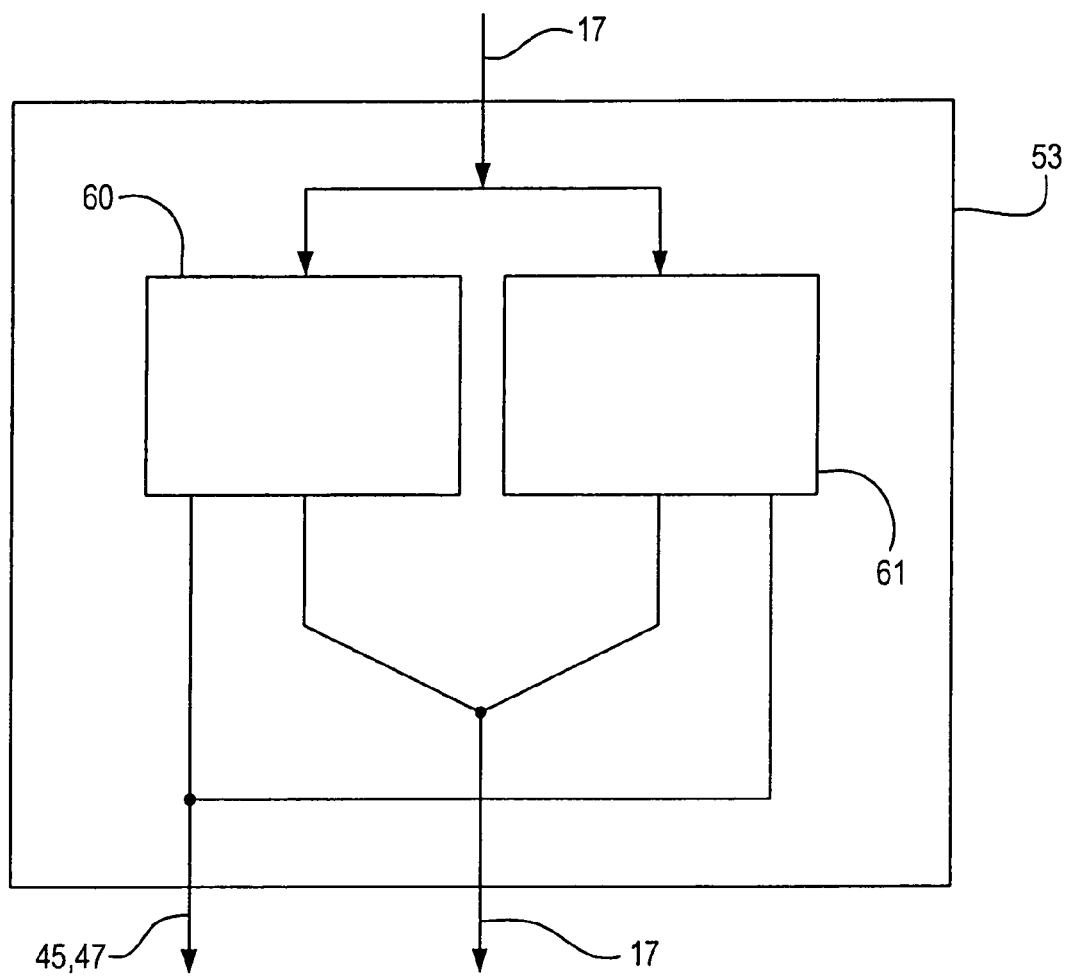
FIG. 6 depicts brake slip and deceleration controllers used in accordance with an alternative embodiment of the present invention to effect the quantitative determination of the brake pressure demanded by the vehicle driver.

As discussed above, according to an embodiment of the present invention, the quantitative determination of the brake pressure demanded by the vehicle driver can be effected using the pilot control valve and brake slip and/or deceleration controllers assigned thereto. In such embodiment, the pilot control valve does not include integral pressure sensors. The signals from the slip and/or deceleration controllers assigned to the pilot control valve are evaluated by means of the control unit—permitting the closure of the closed-loop control circuit for uninterrupted functioning of the automatic braking function. More particularly, referring to FIG. 6, the pressure-related information is fed into brake slip controller 60, which is included in control unit 53, and/or deceleration controller 61 of the autonomous brake assist system. Based on a comparison of the measured brake pressures with the brake pressures calculated and/or requested by the brake assist system, brake pressure adjustments can be implemented using 2/2-way valves 13 and 15.

A vehicle brake control method in accordance with an exemplary embodiment of the present invention includes the steps of: (i) transmitting a pressurized medium from at least one medium source through at least one pressure line to a brake device; (ii) pressurizing a brake line by the operation of a brake pedal by the vehicle driver; (iii) actuating the brake device by means of the pressure; and (iv) quantitatively determining the brake pressure demanded by the driver.

A further embodiment of the inventive method includes the additional steps of: (i) regulating actuation of the brake device by a control unit as a function of the driving situation of the vehicle; (ii) outputting the measured brake pressure in the form of electrical signals and transmitting the signals to the control unit; and (iii) receiving and processing the transmitted signals into the feedback control of the brake device by means of the control unit whilst simultaneously maintaining the control process.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A braking system for a vehicle, comprising: a brake device; a brake line; at least one pressure line configured to carry a pressurized medium from at least one source of said pressurized medium to said brake device; and a brake pedal responsive to brake commands from a driver of said vehicle and configured to connect to said brake line, said brake device being configured to quantitatively determine brake pressure demanded by said driver, said brake device comprising a pilot control valve having at least one measuring device, wherein a first inlet of said pilot control valve is connected to a supply pressure line and a second inlet of said pilot control valve is connected to said brake line.

2. The braking system according to claim 1, further comprising a control unit configured to receive and process brake pressure signals from said at least one measuring device.

3. The braking system according to claim 2, wherein said control unit incorporates said brake pressure signals into a feedback control of the operation of said brake device.

4. The braking system according to claim 3, wherein said control unit simultaneously processes and compares signals representing brake pressure for vehicle stability control and said brake pressure signals from said at least one measuring device.

5. The braking system according to claim 4, wherein said signals representing brake pressure for vehicle stability control represent an autonomously demanded brake pressure of a brake assist system.

6. The braking system according to claim 1, wherein said pilot control valve includes a double check valve and wherein said at least one measuring device is a pressure sensor, said double check valve being configured to conduct said pressurized medium from at least one of (i) at least one of said brake line and a branch line to an outlet line, and (ii) said outlet line to an outlet assigned to a branch of said branch line, and wherein said pressure sensor measures pressure in said outlet line.

7. The braking system according to claim 6, further comprising at least one multi-way valve configured to at least one of open and close at least a part of said branch line, at least one of said at least one multi-way valve and said pressure sensor being electrically actuated.

8. The braking system according to claim 1, wherein said pilot control valve includes a double check valve and wherein said at least one measuring device includes first and second pressure sensors, said double check valve being configured to conduct said pressurized medium from at least one of (i) at least one of said brake line and a branch line to an outlet line, and (ii) said outlet line to an outlet assigned to a branch of said branch line, said first pressure sensor being configured to measure pressure in said brake line, and said second pressure sensor being configured to measure pressure in said branch line.

9. The braking system according to claim 8, further comprising at least one multi-way valve configured to at least one of open and close at least a part of said branch line, at least one of said at least one multi-way valve and said first and second pressure sensors being electrically actuated.

10. The braking system according to claim 1, wherein said brake device comprises at least one slip controller and deceleration controller.

11. The braking system according to claim 10, wherein said at least one slip controller and deceleration controller are configured to (i) perform a comparison of said brake pressure demanded by said driver against an autonomously demanded brake pressure of a brake assist system and (ii) effect adjustment of delivery of said pressurized medium to said brake device based on said comparison.

12. The braking system according to claim 1, wherein said at least one measuring device is configured to output said brake pressure in the form of electrical signals.

13. The braking system according to claim 1, wherein said pilot control valve is assigned to a valve arrangement for transmitting said pressurized medium to a front axle brake device.

14. The braking system according to claim 1, wherein said pilot control valve is assigned to a valve arrangement for transmitting said pressurized medium to a rear axle brake device.

15. The braking system according to claim 1, wherein said pilot control valve is assigned to a tractor safety valve for transmitting said pressurized medium to a vehicle trailer.

16. The braking system according to claim 1, wherein said pilot control valve includes a service relay valve actuatable by pressure transmitted from an outlet line to selectively at least one of conduct said pressurized medium from said supply pressure line to a trailer service coupling and discharge said pressurized medium from said trailer service coupling.

17. A braking system for a vehicle, comprising at least one pressure line configured to carry a pressurized medium from at least one source of said medium to a brake device, a brake pedal for receiving brake commands from a driver of said vehicle and for operating a brake line, said brake line being connectable to said brake device, and means for quantitatively determining brake pressure demanded by said driver, wherein said means for quantitatively determining said brake pressure demanded by said driver includes a pilot control valve having at least one measuring device, and wherein said pilot control valve includes first and second double check valves and wherein said at least one measuring device includes first, second and third pressure sensors, said first double check valve being configured to conduct said pressurized medium from at least one of (i) said second double check valve and a branch line to an outlet line, and (ii) said outlet line to an outlet, said second double check valve being configured to conduct said pressurized medium from at least one of (i) said brake line and a second brake line to a connection of said first double check valve, said first pressure sensor being configured to measure pressure in at least one of said brake line and said second brake line, said second pressure sensor being configured to measure pressure in said branch line, and said third pressure sensor being configured to measure pressure in said outlet line.

18. The braking system according to claim 17, further comprising at least one multi-way valve configured to at least one of open and close at least a part of said branch line, at least one of said at least one multi-way valve and said first, second and third pressure sensors being electrically actuated.

19. A vehicle brake control method, comprising the steps of:
transmitting a pressurized medium from at least one source of said pressurized medium through at least one pressure line to a brake device of a vehicle, said brake device comprising a pilot control valve having at least one measuring device;
pressurizing a brake line by driver actuation of a brake pedal of said vehicle, wherein a first outlet of said pilot control valve is connected to a supply pressure line and a second inlet of said pilot control valve is connected to said brake line;
actuating said brake device by means of pressure in said brake line; and
quantitatively determining brake pressure demanded by said driver using said brake device.

20. The method according to claim 19, further comprising the steps of:
regulating actuation of said brake device as a function of a driving condition of said vehicle using a control unit;
transmitting said brake pressure in the form of electrical signals to said control unit; and
using said control unit, receiving and processing said transmitted signals into feedback control of said brake device and simultaneously maintaining a control process.

\* \* \* \* \*